(12) United States Patent
Darley et al.

(10) Patent No.: US 7,213,394 B2
(45) Date of Patent: May 8, 2007

(54) ENGINE BLOWBY INJECTOR AND INJECTION SYSTEM AND METHOD FOR INJECTING BLOWBY

(75) Inventors: Andrew Darley, Bourne (GB); Nicholas J. Scull, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 36 days.

(21) Appl. No.: 11/043,429

(22) Filed: Jan. 27, 2005

(65) Prior Publication Data

US 2006/0162325 A1 Jul. 27, 2006

(51) Int. Cl.
*F01N 3/00* (2006.01)
(52) U.S. Cl. ............................. 60/283; 60/274; 60/293; 60/298
(58) Field of Classification Search ................... 60/274, 60/283, 293, 298, 307
See application file for complete search history.

(56) References Cited

U.S. PATENT DOCUMENTS

| RE29,978 E | 5/1979 | Leshner et al. |
|---|---|---|
| 5,647,337 A | 7/1997 | Johnson et al. |
| 5,701,732 A | 12/1997 | Nesbitt et al. |
| 5,878,731 A | 3/1999 | Bedkowski |
| 5,937,837 A | 8/1999 | Shaffer et al. |
| 6,063,350 A | 5/2000 | Tarabulski et al. |
| 6,125,624 A | 10/2000 | Prociw |
| 6,192,677 B1 * | 2/2001 | Tost ............................. 60/286 |
| 6,418,712 B2 | 7/2002 | Darley |
| 6,526,746 B1 * | 3/2003 | Wu ............................. 60/286 |

FOREIGN PATENT DOCUMENTS

| DE | 3312818 | 10/1984 |
|---|---|---|
| GB | 1531080 | 11/1978 |
| JP | 8061037 A | 3/1996 |

* cited by examiner

*Primary Examiner*—Thomas Denion
*Assistant Examiner*—Diem Tran
(74) *Attorney, Agent, or Firm*—Tim L. Brackett, Jr.; J. Bruce Schelkopf; Nixon Peabody LLP (57) ABSTRACT

An engine blowby injection system including a blowby passage, and a blowby injector with a blowby flow outlet sized to inject the blowby flow into an exhaust gas flow generated by an internal combustion engine. The blowby injector includes a cooling mechanism for cooling the blowby flow outlet to reduce the likelihood of carboning. In one embodiment, the blowby injector includes an adapter, an injector body including an injector nozzle with the blowby flow outlet, and a flow passage that allows cooling air to flow therethrough. A method of injecting blowby flow from an internal combustion engine is also provided.

22 Claims, 5 Drawing Sheets

ENGINE BLOWBY INJECTOR AND INJECTION SYSTEM AND METHOD FOR INJECTING BLOWBY

BACKGROUND OF THE INVENTION

1. Field of the Invention

The present invention is directed to a blowby injector and a blowby injection system, as well as a method for injecting internal combustion engine blowby flow into an exhaust gas flowstream.

2. Description of Related Art

In an internal combustion engine such as a diesel engine, the differential in pressure above and below the reciprocating pistons causes a small amount of gas to leak from the combustion chambers, past the pistons and the piston rings, and into the crankcase. Leakage gas flow into the crankcase can also result from the engine air handling system and/or on-engine air compressors. Such leakage flow is also commonly referred to as blowby. If a flow path is not provided for the blowby flow, pressure can build in the crankcase which can result in crankcase cover gasket leaks and shortened life of shaft seals.

The conventional prior art method for addressing the above noted problem is to vent the blowby flow to the environment via an open crankcase breather. The problem with such an approach is that the blowby flow picks up oil droplets as it passes through the crankcase, and releases them into the environment. This has a negative impact on the environment, and in some cases, does not satisfy environmental regulations.

One way to overcome the above-mentioned problems is to provide a closed circuit breather system in which the blowby flow is fed into the intake air of the engine for subsequent combustion. However, some of the oil carried with the blowby flow will cause carboning (also known as coking or carbonizing) upon contact with hot engine components such as turbocharger compressors and/or intake air intercoolers. Such carboning in the engine components can reduce the compression efficiency of the turbocharger compressor and/or reduce the effectiveness of the intercooler in removing heat from the charge air. To reduce this problem, gas/oil separators are often employed to try to minimize the flow of oil droplets into the intake air flow. However, provisions of such separators add cost to the engine, and in most cases, do not totally remove the oil content of the blowby flow. This limitation of gas/oil separators is due to the fact that the oil is generally in the form of a fine aerosol which can pass through such separators rather than in the form of sizeable droplets.

In an effort to overcome one or more of the above-mentioned problems, it has been proposed in patents GB 1531080 and DE 3312818, to feed the blowby flow into the exhaust system of the engine. One disadvantage of feeding the blowby flow into the exhaust before the muffler, or silencer as suggested in these references, is that the pressure in the exhaust system upstream of the muffler is likely to be significantly higher than the maximum pressure capability of the crankcase gasket and seals.

Japanese unexamined patent application 8-61037 proposes that the blowby flow be introduced into the exhaust system at a point downstream of the muffler. However, the apparatus disclosed in JP 8-61037 has one key disadvantage in that the blowby flow outlet protrudes into the hot exhaust gas flowstream. The blowby flow outlet is then heated by the hot exhaust. The temperature of the surfaces of the blowby outlet can exceed the boiling point of some of the lighter engine oil components. When the oil droplets then come into contact with the hot blowby outlet surface, the lighter oil components vaporize and leave a deposit of carbon behind. Over time, the carbon deposit accumulates and restricts the blowby flow which can lead to excessive crankcase pressure. Thus, frequent, and possibly difficult, decarboning of the blowby flow outlet is required to maintain proper operation of such an apparatus. Moreover, an apparatus constructed in accordance with JP 8-61037 where the blowby flow outlet is perpendicular to the wall of the tailpipe and formed with a bend, will exacerbate the carboning, and will be expensive to manufacture and install.

U.S. Pat. No. 6,418,712 to Darley discloses a blowby flow outlet that injects the blowby flow after the muffler of the exhaust system. The reference discloses that the blowby apparatus includes an adapter with a first hollow member that engages the wall of the exhaust system, and a nozzle with a second hollow member disposed within the first hollow member that serves as a blowby flow passage. The reference also discloses that the second hollow member is shorter than the first hollow member, and has an outer diameter smaller than the inner diameter of the first hollow member. Such dimensioning of the members is disclosed as defining a space between the members that provides an insulating effect to reduce the temperature of the blowby nozzle. The reference discloses that blowby nozzle temperatures as low as about 160° C. have been attained, thereby reducing the likelihood of carboning at the nozzle and associated service requirements.

However, when the blowby apparatus as described in the Darley reference is applied to high output internal combustion engines that tend to have higher exhaust gas temperatures, the temperature at the blowby nozzle has been found to be in the range of approximately 160° C. to 200° C. At these elevated temperatures, carboning can still occur from the oil mist in the blowby flow which can eventually lead to increased crankcase pressure and increased servicing requirements. Therefore, the above described problems regarding carboning of blowby devices remain unresolved by the prior art.

Therefore, there exists an unfulfilled need for a blowby system and method that can effectively maintain reduced crankcase pressure in an internal combustion engine. In addition, there exists an unfulfilled need for a blowby system and method that can minimize the likelihood of carboning so as to reduce service requirements. Finally, there exists an unfulfilled need for such a blowby system and method that may be used to minimize the likelihood of carboning, even when applied to high output engines that generate exhaust gas at elevated temperatures.

SUMMARY OF THE INVENTION

In view of the foregoing, one aspect of the present invention is a blowby injection system that can effectively maintain crankcase pressure in an internal combustion engine.

One advantage of the present invention is that the provided blowby injection system reduces the likelihood of carboning so as to reduce service requirements.

Still another advantage of the present invention is that the provided blowby injection system reduces the likelihood of carboning, even when applied to high output engines which generate exhaust gas at elevated temperatures.

Another aspect of the present invention is a blowby injector that is used in a blowby injection system, the blowby injector reducing the likelihood of carboning.

Yet another aspect of the present invention is a method for injecting blowby flow into an exhaust flow that reduces the likelihood of carboning.

These and other advantages are attained by an engine blowby injection system in accordance with one embodiment of the present invention, the blowby injection system including a blowby passage that conveys blowby flow from the internal combustion engine, and a blowby injector fluidically connected to the blowby passage to receive the blowby flow, the blowby injector including a blowby flow outlet sized to inject the blowby flow into an exhaust gas flow generated by the internal combustion engine, where the blowby injector includes a cooling means for cooling the blowby injector to reduce the likelihood of carboning of the blowby flow outlet.

In accordance with one embodiment of the present invention, the cooling means includes a flow passage that allows cooling air to flow around the blowby flow outlet. The cooling medium may be cooling air that is drawn into the flow passage by vacuum generated by the exhaust gas flow. In this regard, the cooling means may further include a venturi that increases the vacuum generated by the exhaust gas flow, the venturi including a reducer section, a midsection and a diffuser section, and the blowby injector injecting the blowby flow into the midsection of the venturi. In another embodiment, the cooling means may include a pressure differential device to facilitate flow of the cooling air. The pressure differential device may be a compressor, a blower, and/or a fan.

In accordance with another embodiment, the blowby injector includes an injector nozzle, the blowby flow outlet being positioned at one end of the injector nozzle. The flow passage is at least partially defined by the injector nozzle such that the cooling air flows around the injector nozzle and the blowby flow outlet. The cooling means includes an air inlet fluidically connected to the flow passage to allow the cooling air to flow into the flow passage. The air inlet may include a valve that allows cooling air to flow through the air inlet, but prevents exhaust gas from exiting through the air inlet.

In accordance with yet another embodiment, the blowby flow outlet may be positioned proximate to, but not in, the exhaust gas flow generated by the internal combustion engine. The blowby flow outlet may be provided with a tapered shape to increase the velocity of the blowby flow.

In accordance with another aspect of the present invention, a blowby injector is provided which injects blowby flow from an internal combustion engine into an exhaust gas flow of the internal combustion engine. In accordance with one embodiment of the present invention, the blowby injector includes an injector body having an injector nozzle with a blowby flow outlet sized to inject the blowby flow into the exhaust gas flow, and a flow passage fluidically connected to the injector body to allow cooling medium to flow therethrough to reduce the temperature of the injector nozzle and reduce the likelihood of carboning of the blowby flow outlet.

In another embodiment, the blowby injector also includes an air inlet fluidically connected to the flow passage to allow cooling air used for the cooling medium to flow into the flow passage, the flow passage extending around the injector nozzle so that the cooling air surrounds the injector nozzle. The air inlet may include a valve that allows cooling air to flow through the air inlet, but prevents exhaust gas from exiting through the air inlet. The injector body of the blowby injector may include an interior cavity, the air inlet being fluidically connected to the flow passage through the interior cavity. The blowby flow outlet may be positioned proximate to, but not in, the exhaust gas flow generated by the internal combustion engine. The blowby flow outlet may also be provided with a tapered shape to increase the velocity of the blowby flow. The cooling air may be drawn into the flow passage by vacuum generated by the exhaust gas flow such as by a venturi, or be facilitated by a pressure differential device.

Yet another aspect of the present invention is a method of injecting blowby flow from an internal combustion engine. In accordance with one embodiment, the method includes of providing a blowby injector with a blowby flow outlet, conveying blowby flow from the internal combustion engine to the blowby injector, injecting the conveyed blowby flow through the blowby flow outlet into an exhaust gas flow generated by the internal combustion engine, and flowing cooling air through the blowby injector to cool the blowby flow outlet to thereby reduce the likelihood of carboning.

In another embodiment of the present invention, the method may further include injecting the cooling air into the exhaust gas flow together with the blowby flow, and/or positioning the blowby flow outlet proximate to, but not in, the exhaust gas flow. Flowing the cooling air may be attained by drawing the cooling air using vacuum generated by the exhaust gas flow. In this regard, the method may further include flowing the exhaust gas flow through a venturi to increase the generated vacuum. In addition, the velocity of the blowby flowstream may be increased prior to injection into the exhaust flowstream.

In yet another embodiment, the method may further include providing a flow passage in the blowby injector through which the cooling air flows to cool the blowby flow outlet. In this regard, an air inlet may be provided, and the method may further include allowing cooling air to flow through the air inlet, but preventing exhaust gas from exiting through the air inlet. In still another embodiment, the method may include generating a pressure differential to facilitate flow of the cooling air.

In accordance with still another aspect of the present invention, a blowby injection system for an internal combustion engine is provided having a plurality of components conveying blowby flow from the internal combustion engine, injecting the conveyed blowby flow into an exhaust gas flow generated by the internal combustion engine, and flowing cooling air to cool the component that injects the blowby flow into the exhaust gas flow to thereby reduce the likelihood of carboning thereof.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

Figure 1:
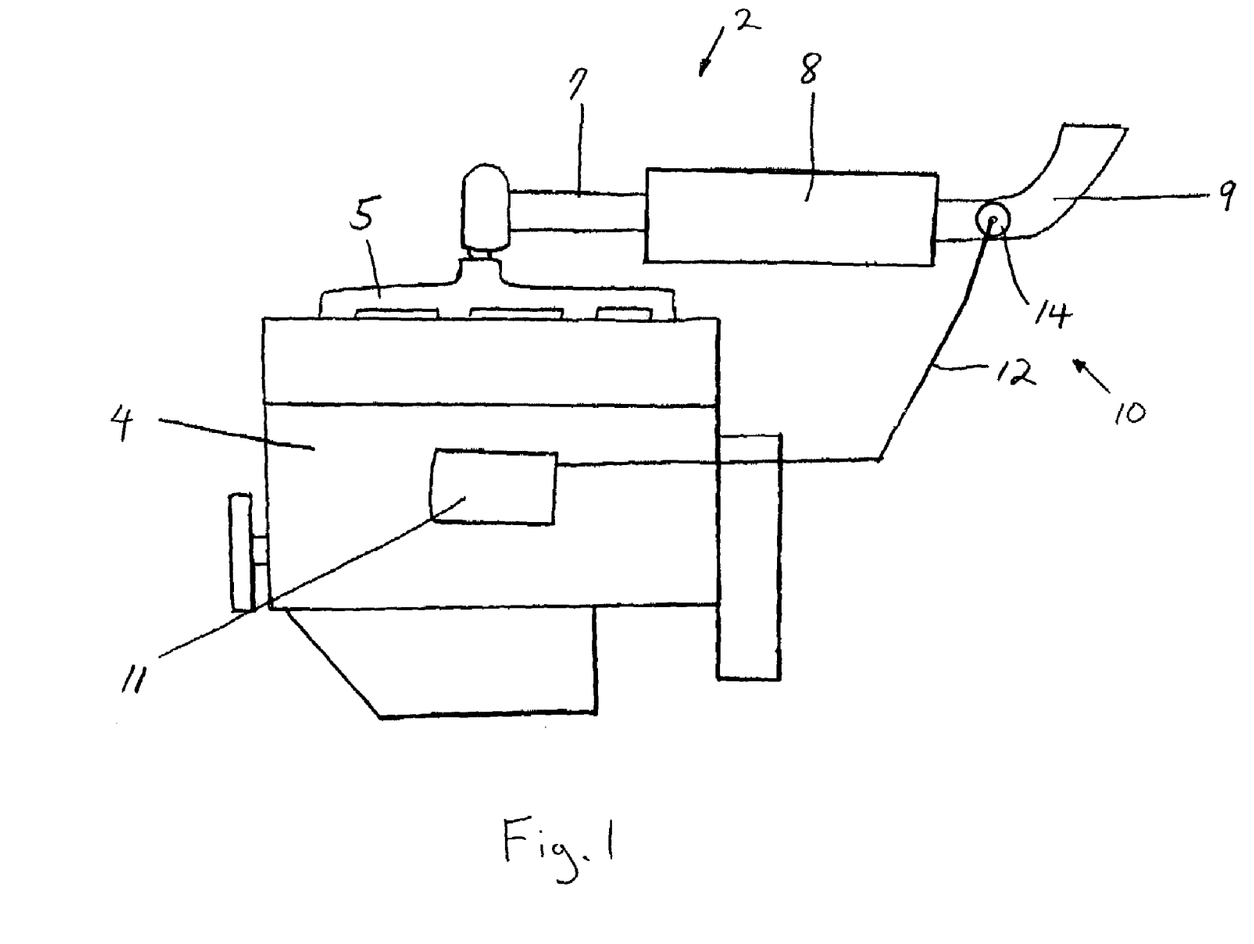
FIG. 1 is a schematic illustration of an internal combustion engine having one example implementation of a blowby injection system of the present invention.

FIG. 1 is a schematic illustration of an internal combustion engine 2 that includes a blowby injection system 10 in accordance with one example embodiment of the present invention. As can be seen, the internal combustion engine 2 includes an engine block 4 that generates exhaust gas flow as a result of combustion, the exhaust gas flow leaving the engine block via an exhaust system which includes an exhaust manifold 5, piping 7, a muffler 8, and an exhaust pipe 9. As explained below, the blowby injection system 10 injects the blowby flow from the internal combustion engine 2, into the exhaust gas flow while reducing the likelihood of carboning.

The blowby injection system 10 in the illustrated embodiment, includes a crankcase outlet housing 11, a blowby injector 14, and a blowby passage 12 for conveying blowby flow to the blowby injector 14. A separator (not shown) may be provided within the crankcase outlet housing 11 to separate most of the oil from the blowby flow so as to minimize the amount of oil that is conveyed to the blowby injector 14. In addition, a positive crankcase ventilation valve (not shown) may also be provided in the crankcase outlet housing 11, or along the blowby passage 12. As shown in FIG. 1, the blowby injector 14 of the illustrated embodiment is provided on the exhaust pipe 9 of the internal combustion engine 2, downstream of the muffler 8. The blowby injector 14 is adapted to inject blowby flow into the exhaust gas flowstream as it passes through the exhaust pipe 9.

Figure 2:
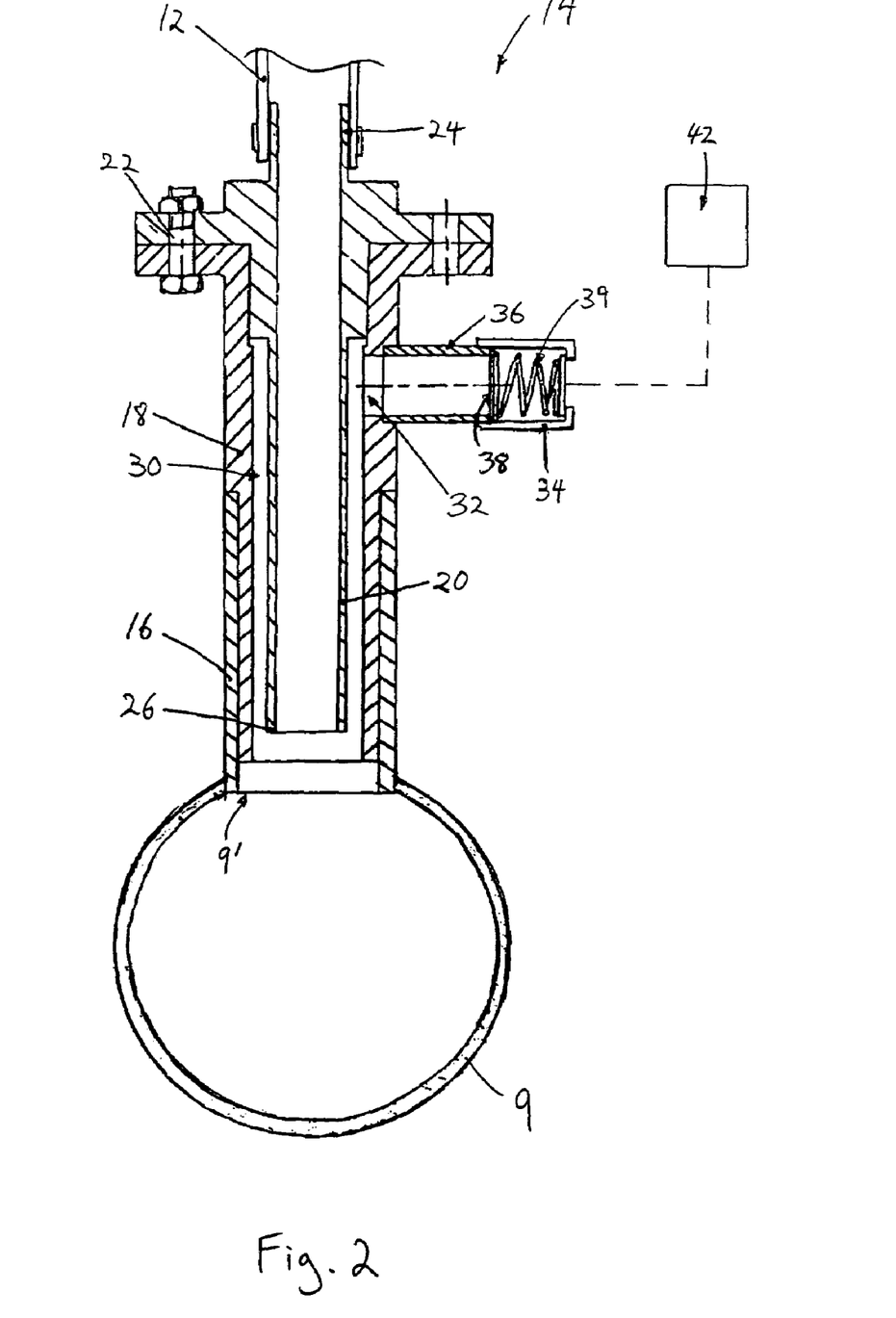
FIG. 2 is a cross sectional view of a blowby injector in accordance with one example implementation of the present invention.

FIG. 2 is a cross sectional view of the blowby injector 14 in accordance with example implementation. As described below, the blowby injector 14 of the present invention minimizes the likelihood of carboning by cooling the nozzle through which the blowby flow is injected into the exhaust gas flowstream. Referring to FIG. 2, the blowby injector 14 is mounted to the exhaust pipe 9 by an adapter 16. The exhaust pipe 9 is provided with an opening 9' so that the adapter 16 is in fluidic communication with the exhaust pipe 9, and further allows the injection of the blowby flow into the exhaust gas flow that is passing through the interior of the exhaust pipe 9. The adapter 16 may be secured to the exhaust pipe 9 by a weld, or in any another appropriate manner.

The blowby injector 14 in the illustrated embodiment includes an injector body 18 which is secured to the adapter 16, for example, via an interference fit, a clamp, or any other appropriate manner. Preferably, the injector body 18 is removably secured to the adapter 16 to allow service of the blowby injector 14. Of course, in other embodiments, the injector body and the adapter may be integrally made as a single component which is secured to the exhaust pipe 9 as an assembly. It should be noted that in the illustrated embodiment, the blowby injector 14 is secured substantially perpendicular to the exhaust pipe 9. However, in other embodiments, the blowby injector 14 may be secured at an angle relative to the exhaust pipe 9 so that the blowby flow and the cooling air can be introduced into the exhaust gas flowstream at an angle.

The blowby injector 14 of the illustrated embodiment also includes an injector nozzle 20 that is received by the injector body 18, for example, via fasteners 22 (only one shown) which secure the injector nozzle 20 and the injector body 18 together. The injector nozzle 20 includes a blowby flow inlet 24 sized to allow securing of the blowby passage 12 thereto, thereby connecting the crankcase outlet housing 11 to the injector nozzle 20 so that the blowby flow can be provided to the injector nozzle 20.

In addition, the injector nozzle 20 includes a blowby flow outlet 26 for injecting the blowby flow into the exhaust gas flow passing through the exhaust pipe 9. The injector nozzle 20 extends within the injector body 18 and has a smaller outer diameter than the inner diameter of the injector body 18. Thus, a flow passage 30 is defined between the interior of the injector body 18 and the injector nozzle 20. It should be noted that whereas in the illustrated embodiment, these components are substantially tubular in shape so that the flow passage 30 is annular in shape, these components may be implemented differently in other embodiments.

The flow passage 30 acts to provide an insulation effect around the injector nozzle 20 thereby reducing the temperature of the injector nozzle 20 and the blowby flow outlet 26. This reduction in temperature correspondingly reduces the likelihood of carboning at the blowby flow outlet 26, and further reduces the associated service requirements. The length of the injector nozzle 20 in the illustrated embodiment is such that the blowby flow outlet 26 does not extend into the interior of the exhaust pipe 9 and into the exhaust gas flow. Such positioning reduces heating of the blowby flow outlet 26 by the exhaust gas flowing through the exhaust pipe 9.

In addition, the blowby injector 14 in accordance with the present invention is also provided with a cooling mechanism or feature for further reducing the temperature of the injector nozzle 20 and the blowby flow outlet 26. This further cooling is attained by providing a cooling medium within the flow passage 30 that flows therethrough to reduce the temperature of the injector nozzle 20 and the blowby flow outlet 26. The cooling medium may be flowing air or other fluid that further reduces temperature of the blowby flow outlet 26, thus, reducing the likelihood of carboning, even when the blowby injection system 10 is applied to a high output engine which generates relatively high temperature exhaust gas.

In the above regard, the illustrated embodiment of the blowby injection system 10 includes an air induction passage 32 formed on the injector body 18 which is connected to a valve 34 via an air inlet 36, the valve 34 being implemented as a one way check valve in the illustrated embodiment. The valve 34 includes a valve element 38 that is biased to the closed configuration shown by a return spring 39 which prevents the exhaust gas flow passing through the interior of the exhaust pipe 9 from escaping through the flow passage 30. Of course, the valve 34 may be implemented in any appropriate manner in other embodiments, for example, using a ball type valve.

In operation, the blowby flow is injected from the blowby flow outlet 26 of the injector nozzle 20 into the exhaust gas flow passing through the interior of the exhaust pipe 9. As the exhaust gas flow passes through the interior of the exhaust pipe 9. Cooling medium such as ambient cooling air flows through the valve 34 and passes around the valve element 38 by overcoming the force of spring 39. The cooling air passing through the valve 34 flows through the flow passage 30, thereby cooling the injector nozzle 20 and the blowby flow outlet 26. In this regard, the air inlet 36 is positioned proximate to the injector nozzle 20 at an end opposite to that of the blowby flow outlet 26. This allows the cooling air to flow over a significant portion of the injector nozzle 20 to thereby cool it. In the illustrated embodiment, the cooling air is then mixed with the exhaust gas flow in the interior of the exhaust pipe 9, as well as the blowby flow from the blowby flow outlet 26, for release into the atmosphere. Thus, in addition to the insulating effect provided by the flow passage 30, the blowby injection system 10 in accordance with the present embodiment operates to provide additional cooling to the injector nozzle 20 and the blowby flow outlet 26 by flowing cooling air through the flow passage 30.

The cooling air that is provided through the valve 34 should preferably have a pressure downstream of the valve 34 that is higher than the static pressure at the blowby flow outlet 26 to facilitate flow of the cooling air into the flow passage 30. This pressure differential can be attained in any appropriate manner. In the illustrated example, the pressure differential is generated by pressure differential device 42 which is schematically illustrated in FIG. 2 as being fluidically connected to the valve 34 by the dashed line. For example, the cooling air may be pressurized using a device such as a compressor, blower, fan, etc. for forcibly blowing cooling air into the flow passage 30. Alternatively, a vacuum may be provided to suck in the cooling air into the flow passage, and provide the cooling air to the exhaust flowstream. This may be attained using a device such as a venturi as explained in detail relative to a preferred embodiment discussed below, or using any other appropriate device.

Figure 3:
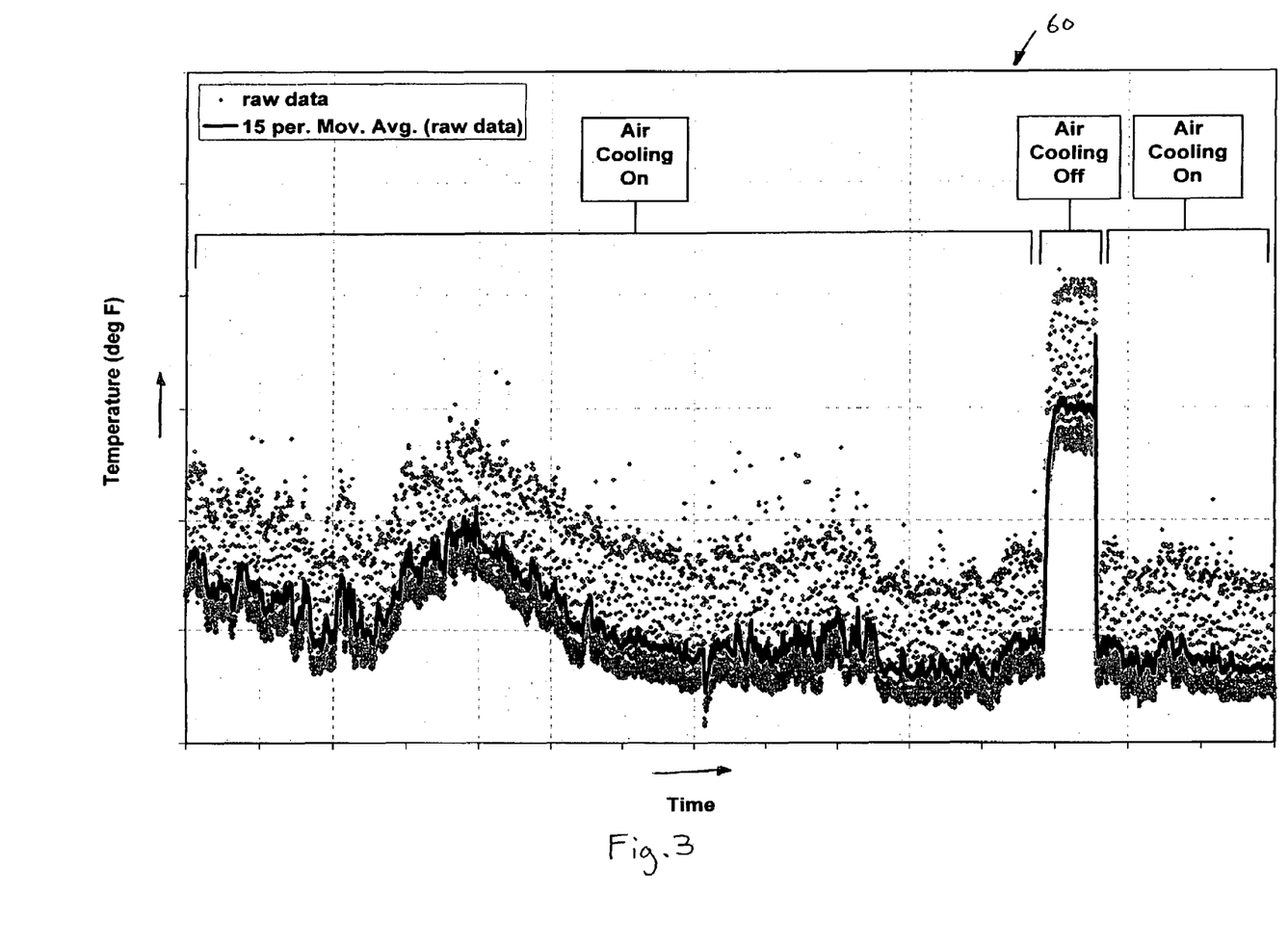
FIG. 3 is a graph showing measured temperature data for a blowby flow outlet of an injector nozzle.

The above noted additional cooling as provided by the cooling mechanism of the present invention has been found to significantly reduce the temperature of the blowby flow outlet 26. The realized reduction in temperature correspondingly reduces the likelihood of carboning, even when the blowby injection system 10 is applied to a high output engine which generates relatively high temperature exhaust gas flow. In this regard, FIG. 3 shows graph 60 plotting the measured temperature data resulting during operation of the present invention as shown in FIG. 2. The vertical axis of graph 60 shows the temperature at the tip of the blowby flow outlet for the blowby injector, the temperature increasing in the direction of the indicated arrow, while the horizontal axis of graph 60 shows time which increase in the direction of the indicated arrow. Each of the small points plotted indicate a raw data point, while line 64 indicates the moving average of the raw data points.

The three time periods during which temperature measurements were taken are indicated in the legend at the top of the graph 60. The blowby injection system was initially operated so that the injector nozzle injected blowby flow while cooling air was inducted to cool the injector nozzle in the manner described relative to FIG. 2. Then, the induction of cooling air was prevented so that additional cooling was not provided. As can be seen, the temperature at the blowby flow outlet increased rapidly. Air cooling was then provided again which quickly reduced the temperature of the blowby flow outlet 26.

It should also be noted that whereas the present invention was described above where cooling air is used as the cooling medium, the present invention is not limited thereto. Alternatively, a liquid fluid such as a circulating coolant may be used instead of cooling air in other embodiments of the present invention. Of course, if a coolant is used, the flow passage 30 would be sealed from the interior of the exhaust pipe 9 so that the coolant is not introduced into the exhaust pipe 9. In addition, the coolant would likely have to be circulated and cooled. Thus, such an implementation utilizing coolant would add complexity and cost as compared to the embodiment of FIG. 2 discussed above, or similar embodiments where air is used for cooling.

In accordance with one preferred embodiment of the present invention, a venturi is provided on the exhaust pipe 9, and the adapter 16 is mounted to the exhaust pipe 9 at the venturi, to thereby increase the vacuum generated at the opening 9' and provide a pressure differential to draw in the cooling air into the exhaust gas flowstream. The increased vacuum is used to effectively increase the amount of cooling air that is drawn through the flow passage 30, thereby increasing the cooling effect on the injector nozzle 20 and the blowby flow outlet 26. Hence, the likelihood of carbonizing can be even further reduced in the described venturi implementation of the blowby injection system 10 of the present invention.

Figure 4:
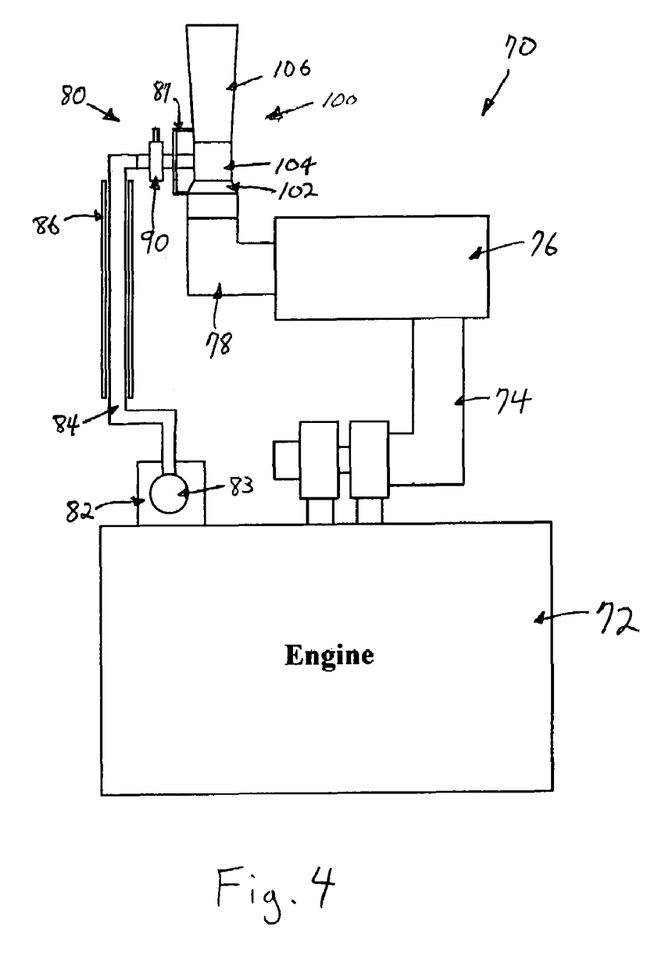
FIG. 4 is a schematic illustration of an internal combustion engine having another example implementation of a blowby injection system of the present invention.

In the above regard, FIG. 4 is a schematic illustration of an internal combustion engine 70 having a blowby injection system 80 in accordance with a preferred embodiment of the present invention. The internal combustion engine 70 includes an engine block 72 that generates exhaust gas as a result of combustion, the exhaust gas leaving the engine block 72 via piping 74, muffler 76, and exhaust pipe 78. The blowby injection system 80 includes a crankcase outlet housing 82, and a blowby passage 84 for conveying blowby flow to a blowby injector 90. A positive crankcase ventilation valve 83 is provided in the crankcase outlet housing 82, and separator (not shown) may also be provided in the crankcase outlet housing 82. In addition, the illustrated embodiment is provided with optional insulation 86 surrounding the blowby passage 84 to prevent the formation of water condensation which could drain back into the crankcase, as well as a heat shield 87 that reduces the heat to which the blowby injector 90 is exposed to.

Figure 5:
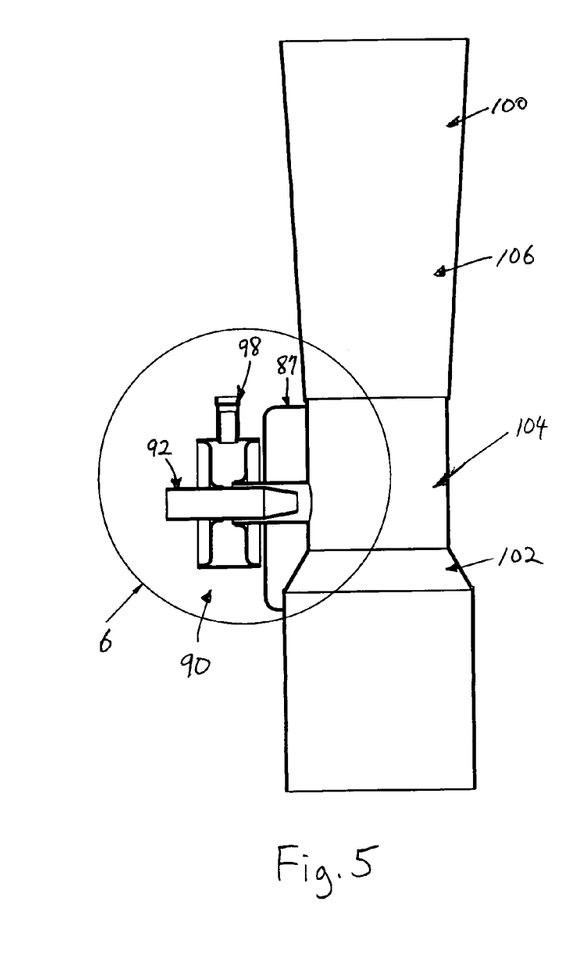
FIG. 5 is an enlarged view of the blowby injector and the venturi shown in FIG. 4.

FIG. 5 shows an enlarged, cross sectional view, of various components of the blowby injection system 80 of FIG. 4. As shown in FIGS. 4 and 5, the blowby injection system 80 of the illustrated embodiment also includes a venturi 100 which is secured to, or otherwise made integral with, the exhaust pipe 78. The venturi 100 includes a reducer section 102, a midsection 104, and a diffuser section 106 as shown most clearly in FIG. 5. The reducer section 102 and the diffuser section 106 increases the velocity of the exhaust gas flowing through the midsection 104 of the venturi 100. The diffuser section 106 allows the exhaust from the exhaust pipe 78 to be released to the atmosphere.

The blowby injector 90 of the blowby injection system 80 is provided on the midsection 104 of the venturi 100, preferably downstream of the muffler 76. In this regard, an adapter 96 that is in fluidic communication with the exhaust gas flow is provided on the midsection 102 of the venturi 100 by a weld or in any another appropriate manner. The blowby injector 90 is adapted to inject blowby flow into the exhaust gas flow as it passes through the venturi 100, and is further provided with a cooling mechanism as described in further detail below.

Figure 6:
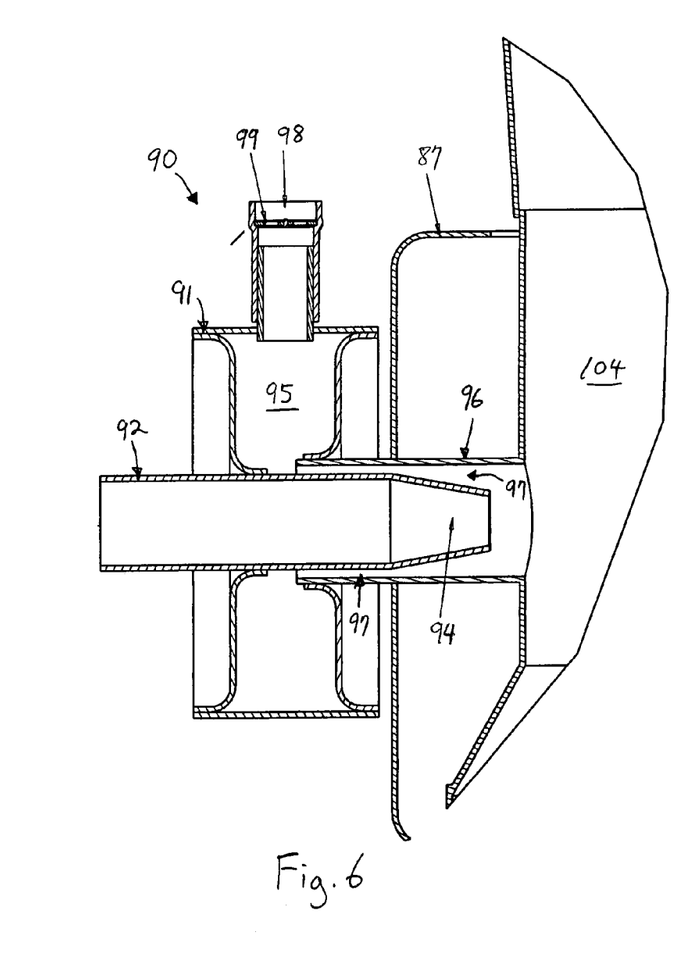
FIG. 6 is an enlarged cross sectional view of the blowby injector shown in FIG. 5.

As most clearly shown in the cross sectional views of FIGS. 5 and 6, the blowby injector 90 includes an injector body 91 that secures a nozzle injector 92 to the adapter 96 that is in fluidic communication with the midsection 102 of the venturi 100. The injector body 91 and the adapter 96 of the illustrated embodiment are integrally made as a single component in the manner shown, the assembly being secured to the venturi 100 directly, for example, by welding. The nozzle injector 92 extends along the injector body 91 and terminates at a blowby flow outlet 94, which in the present embodiment, has a tapered shape, the blowby flow outlet 94 being positioned in the adapter 96. The tapered shape of the blowby flow outlet 94 increases the velocity of the blowby flow so that the injected blowby flow penetrates deep into the exhaust flow stream flowing through the midsection 104 of the venturi 100. This decreases the service requirements of the blowby injector 90 by reducing the amount of oil that adheres to the walls of the injector nozzle 92 and the venturi 100.

The injector body 91 of the blowby injector 90 also includes an interior cavity 95. An air inlet 98 is connected to the interior cavity 95, the air inlet 98 being provided with a valve 99 that allows air to flow into the interior cavity 95, but prevents exhaust gas from escaping through the air inlet 98. As shown most clearly in FIG. 6, the injector nozzle 92 is smaller in diameter than the inner diameter of the adapter 96. Thus, a flow passage 97 is provided between them which is open to the interior cavity 95 of the injector body 91. In the illustrated embodiment, the flow passage 97 is substantially annular in shape because the injector nozzle 92 and the adapter 96 are substantially tubular in shape.

In the manner similar to the embodiment described relative to FIG. 2, the flow passage 97 provides an insulation effect to thereby reduce the temperature of the injector nozzle 92 and the blowby flow outlet 94 when blowby flow is injected there through. In addition, further cooling of the injector nozzle 92 and the blowby flow outlet 94 is attained by providing a cooling medium such as cooling air through the flow passage 97. In particular, during operation, the blowby flow is injected from the blowby flow outlet 94 into the exhaust gas flow moving through the venturi 100. Vacuum passively generated by the exhaust gas flow draws in cooling air through inlet 98 via valve 99 to provide additional cooling to the injector nozzle 92 and the blowby flow outlet 94.

As compared to the blowby injector described above relative to FIG. 2, the venturi 100 of blowby injection system 80 passively generates a pressure differential so that the cooling air can be drawn into the flow passage 97 to cool the injector nozzle 92 and the blowby flow outlet 94. The cooling air is then mixed with the exhaust gas flow and the blowby flow for release into the atmosphere through the diffuser section 106. In the manner described, the blowby injection system 80 of the present invention reduces the likelihood of carboning, even when the blowby injection system 80 is applied to a high output engine which generates relatively high temperature exhaust gas flow. Correspondingly, reduction in associated service requirements of the blowby injection system 80 is also realized by the present invention.

It should also be evident from the above that the present invention provides a method for injecting blowby flow from an internal combustion engine. The method includes providing a blowby injector with a blowby flow outlet, conveying blowby flow to the blowby injector, injecting the conveyed blowby flow through the blowby flow outlet into an exhaust gas flow, and flowing cooling air through the blowby injector to cool the blowby flow outlet thereby reducing the likelihood of carboning.

As can be appreciated, the method may further include injecting the cooling air into the exhaust gas flow together with the blowby flow, and/or positioning the blowby flow outlet proximate to, but not in, the exhaust gas flow. A pressure differential may be generated to facilitate flow of the cooling air. Preferably, flowing the cooling air is attained by drawing the cooling air using vacuum generated by the exhaust gas flow. The vacuum generated may be generated by flowing the exhaust gas flow through a venturi as described.

The described cooling of the blowby flow outlet may be attained by providing a flow passage in the blowby injector through which the cooling air flows. In this regard, an air inlet fluidically connected to the flow passage may be provided to allow the cooling air to flow into the flow passage, while the method further includes allowing cooling air to flow through the air inlet, but preventing exhaust gas from exiting through the air inlet.

In view of the above, it should be evident to one of ordinary skill in the art that the present invention provides a blowby system, a blowby injector, and method for effectively maintaining crankcase pressure in an internal combustion engine, while minimizing the likelihood of carboning so as to reduce service requirements, even when applied to high output engines that generate exhaust gas flow that is at elevated temperatures.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A blowby injection system for an internal combustion engine, the blowby injection system comprising:
   a blowby passage that conveys blowby flow from the internal combustion engine;
   a blowby injector fluidically connected to said blowby passage to receive the blowby flow, said blowby injector including a blowby flow outlet sized to inject the blowby flow into an exhaust gas flow generated by the internal combustion engine; and
   a cooling means for cooling said blowby injector to reduce the likelihood of carboning of said blowby flow outlet, said cooling means including a flow passage that allows cooling air to flow around said blowby flow outlet, the cooling air being drawn into the flow passage by vacuum generated by the exhaust gas flow;
   wherein said cooling means further comprises a venturi that increases said vacuum generated by the exhaust gas flow.

2. The system of claim 1, wherein said blowby injector includes and injector nozzle, said blowby flow outlet being positioned at one end of said injector nozzle, and said flow passage is at least partially defined by said injector nozzle such that the cooling air flows around said injector nozzle and said blowby flow outlet.

3. The system of claim 1, wherein said blowby flow outlet is positioned proximate to, but not in, the exhaust gas flow generated by the internal combustion engine.

4. The system of claim 1, wherein said blowby flow outlet has a tapered shape to increase the velocity of the blowby flow.

5. The system of claim 1, wherein said venturi includes a reducer section, a midsection and a diffuser section.

6. The system of claim 5, wherein said blowby injector injects the blowby flow into said midsection of said venturi.

7. The system of claim 1, wherein said cooling means includes an air inlet fluidically connected to said flow passage to allow the cooling air to flow into said flow passage.

8. The system of claim 7, wherein said air inlet includes a valve that allows cooling air to flow through said air inlet, but prevents exhaust gas from exiting through said air inlet.

9. The system of claim 1, wherein said cooling means further includes a pressure differential device to facilitate flow of the cooling air.

10. The system of claim 9, wherein said pressure differential device is at least one of a compressor, a blower, and a fan.

11. A blowby injector that injects blowby flow from an internal combustion engine into an exhaust gas flow of the internal combustion engine, said blowby injector comprising:
an injector body fluidically connected to the exhaust gas flow, said injector body including an injector nozzle with a blowby flow outlet sized to inject the blowby flow into the exhaust gas flow; and
a flow passage fluidically connected to said injector body to allow cooling medium to flow through said injector body to reduce the temperature of said injector nozzle and reduce the likelihood of carboning of said blowby flow outlet, the cooling
medium being cooling air, and the blowby injector further comprising an air inlet fluidically connected to said flow passage allowing the cooling air to flow into said flow passage, said flow passage extending around said injector nozzle so that the cooling air surrounds said injector nozzle;
wherein said blowby injector is positioned to inject the blowby flow into a venturi that increases the vacuum generated by the exhaust gas flow.

12. The blowby injector of claim 11, wherein said air inlet includes a valve that allows the cooling air to flow through said air inlet, but prevents exhaust gas from exiting through said air inlet.

13. The blowby injector of claim 11, wherein said blowby flow outlet is positioned proximate to, but not in, the exhaust gas flow generated by the internal combustion engine.

14. The blowby injector of claim 11, wherein said blowby flow outlet has a tapered shape to increase the velocity of the blowby flow.

15. The blowby injector of claim 11, further comprising a pressure differential device to facilitate flow of the cooling air.

16. The blowby injector of claim 11, wherein said venturi includes a reducer section, a midsection and a diffuser section, said blowby injector injecting the blowby flow into said midsection.

17. A method of injecting blowby flow from an internal combustion engine comprising:
providing a blowby injector with a blowby flow outlet;
conveying blowby flow from the internal combustion engine to the blowby injector;
injecting the conveyed blowby flow through said blowby flow outlet into an exhaust gas flow generated by the internal combustion engine;
flowing a cooling medium through said blowby injector to cool said blowby flow outlet to thereby reduce the likelihood of carboning, the cooling medium being cooling air; and the method further including injecting cooling air into the exhaust gas flow together with the blowby flow, said flowing of cooling air being attained by drawing the cooling air using vacuum generated by the exhaust gas flow; and
flowing the exhaust gas flow through a venturi to increase the generated vacuum.

18. The method of claim 17, further including positioning said blowby flow outlet proximate to, but not in, the exhaust gas flow.

19. The method of claim 17, further including increasing the velocity of the breather flowstream injected into the exhaust flowstream.

20. The method of claim 17, further including generating a pressure differential to facilitate flow of the cooling air.

21. The method of claim 17, further including providing a flow passage in said blowby injector through which the cooling air flows to cool said blowby flow outlet.

22. The method of claim 21, further including providing an air inlet fluidically connected to said flow passage to allow the cooling air to flow into said flow passage, but preventing exhaust gas from exiting through said air inlet.

* * * * *